(12) United States Patent
Lee

(10) Patent No.: US 6,537,409 B2
(45) Date of Patent: Mar. 25, 2003

(54) FINGER TAPE FOR AIDING BOWLING

(76) Inventor: Hyo Seong Lee, 168-27 Nokbon-dong Eunpyung-ku, Seoul (KR)

( * ) Notice: Subject to any disclaimer, the term of this patent is extended or adjusted under 35 U.S.C. 154(b) by 0 days.

(21) Appl. No.: 09/759,686

(22) Filed: Jan. 12, 2001

(65) Prior Publication Data

US 2001/0008165 A1 Jul. 19, 2001

(30) Foreign Application Priority Data

Jan. 15, 2000 (KR) .......................................... 2000-1860

(51) Int. Cl.⁷ .......................... B44C 1/165; B41M 8/12; B32B 81/00; A63B 43/00; A61F 13/10
(52) U.S. Cl. ...................... 156/230; 156/231; 156/238; 156/247; 156/277; 156/289; 428/40.1; 428/41.8; 428/197; 428/202; 428/355 R; 427/2.31; 427/208.4; 473/127; 473/128; 473/129; 473/130; 662/44; 662/54; 662/58; 662/61
(58) Field of Search ................................. 156/160, 230, 156/231, 238, 242, 243, 277, 287, 293; 428/40.1, 41.5, 41.8, 195, 197, 202, 343, 352, 355 R; 427/2.31, 146, 147, 155, 208.4, 372.2; 602/41, 44, 54, 57, 58, 61; 473/127, 128, 129, 130

(56) References Cited

U.S. PATENT DOCUMENTS

| | | | | | |
|---|---|---|---|---|---|
| 2,708,578 A | * | 5/1955 | Mitchell | ...................... | 473/130 |
| 2,979,664 A | * | 4/1961 | Mitchell | ...................... | 473/130 |
| 3,266,804 A | * | 8/1966 | Carter | .......................... | 473/130 |
| 3,271,031 A | * | 9/1966 | Mitchell | ...................... | 473/130 |
| 3,342,488 A | * | 9/1967 | Novatniak | ................... | 473/130 |
| 4,716,194 A | * | 12/1987 | Walker et al. | ............... | 524/806 |
| 4,734,320 A | * | 3/1988 | Ohira et al. | ................ | 428/40.1 |
| 5,261,660 A | * | 11/1993 | Rowland | ..................... | 473/130 |

* cited by examiner

Primary Examiner—J. A. Lorengo
(74) Attorney, Agent, or Firm—Roberts, Abokhair & Mardula, LLC

(57) ABSTRACT

Disclosed is a finger tape for aiding bowling. The thumb, the middle finger and the ring finger are inserted into holes formed in a bowling ball. Upon bowling, a player grips the ball by inserting the thumb, the middle finger and the ring finger into the holes formed in the ball. For releasing and rolling the ball, the thumb is instantly slipped out of the hole, followed by the middle finger and the ring finger while spinning the ball. Accordingly, an elasticized cotton tape with gravure printed acryl resin adhesive having different effects depending on actions of the fingers is attached to the thumb, the middle finger and the ring finger to obtain effective bowling results, wherein the thumb tape slides easily and the finger tape provides better grip, based on differing amounts of hardener in the adhesive.

9 Claims, 2 Drawing Sheets

FINGER TAPE FOR AIDING BOWLING

FIELD OF THE INVENTION

The present invention relates, generally, to a finger tape for aiding fingers to grip a bowling ball during bowling and, in particular, to a tape consisting of a base cloth mixed woven with cotton yarns and elastic yarns, on one surface of which a mixture of an acryl resin and 5% by weight of a hardener based on the weight of the acryl resin is applied in a gravure printing manner.

BACKGROUND OF THE INVENTION

On the surface of a bowling ball are provided three holes to which the thumb, the middle finger and the ring finger are inserted, respectively, to grip the ball. During a bowling game, a player releases a ball after taking preparatory action for better rolling the ball. At that time, the thumb is instantly slipped out of the hole while the middle and the ring fingers are slipped out from the holes to spin the ball in the direction of the ball. The degree of spin on the ball is partially responsible for knocking down the pins which are hit by the ball. Hence, the fingering technique or the condition of the fingers inserted into the ball greatly affects the bowling game. The player becomes fatigued as the bowling game progresses. Also, as the number of times a player rolls and releases the ball increases, sweat is generated on the fingers, causing the fingers not to suitably grip the ball and not to play technically well, thereby making the player ineffective in exerting his or her ability.

SUMMARY OF THE INVENTION

Accordingly, an object of the present invention for alleviating the problems as described above is to provide a finger tape for use in taping fingers of bowlers, which functions to protect the fingers inserted into holes of a bowling ball and prevent the fingers from slipping out of the ball.

To achieve the object of the present invention, sweat is readily flown out between the tape and skin so that, while the adhesive printed to the tape is flown out the tape, the fingers are prevented from gliding into the holes. In addition, to improve the function of the thumb, and the functions of a middle finger and a ring finger, the adhesive used in the tape attached to the thumb is distinguished from the adhesive used in the tape attached to the middle finger and the ring finger. Such different adhesives are printed to the tape. In order to flow the sweat between the tape and the skin out easily, it is preferred that the adhesive be transferred to the tape from the transfer paper to which the adhesive is printed in a gravure printing manner.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The present invention comprises a base cloth woven with a cotton yarn 11 and an elastic yarn 12, a mixture of an acryl resin and a hardener useful as an adhesive, and a transfer paper 14 for transferring the mixture.

Figure 1:
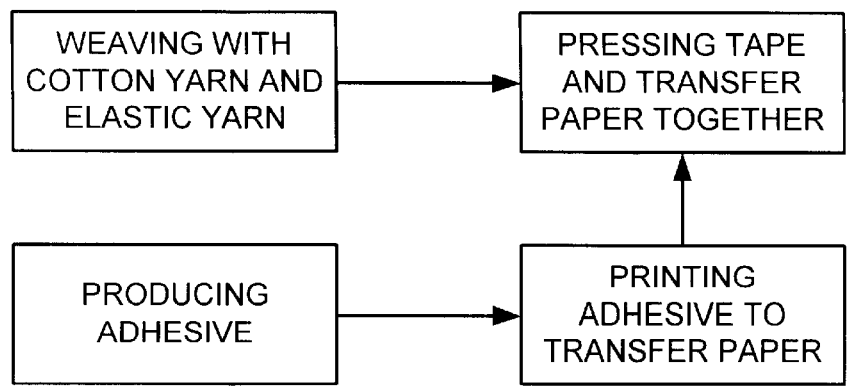
FIG. 1 is a flow diagram showing a process for preparation of a finger tape of the present invention.

With reference to FIG. 1, there is illustrated a process comprising weaving with the cotton yarn 11 and the elastic yarn 12; producing a hardening adhesive 13 by mixing an acryl resin with 5±0.5% of a hardener, based on the weight of the acryl resin; producing a softening adhesive 13 by mixing an acryl resin with 3.5±0.5% of a hardener, based on the weight of the acryl resin; printing the adhesive 13 to the transfer paper 14 in a gravure printing manner; and pressing the tape 21 woven with the cotton yarn 11 and the elastic yarn 12, along with the transfer paper 14 to which the adhesive 13 is printed.

The tape 21 comprises a base cloth woven with the cotton yarn 11 and the elastic yarn 12, wherein the weaving manner used in the present invention depends on conventional textile manufacturing. To make a resilient tape, the tape has a composition of cotton yarn (93%) and elastic yarn (7%), thereby having an elasticity of 20±10%. This formed tape has similar elasticity to that of the skin so that motions of the fingers are not restricted.

As one type of adhesive 13, the hardening adhesive 13 comprising a mixture of 95±0.5% by weight of the acryl resin and 5±0.5% by weight of the hardener, is applied to the transfer paper 14 within 3 hours in a gravure printing manner, and then transferred. As another type, the softening adhesive 13 comprising a mixture of 96.5±0.5% by weight of the acryl resin and 3.5±0.5% by weight of the hardener, is applied to the transfer paper 14 within 6 hours in a gravure printing manner, and then transferred.

The gravure printing manner is the same as an intaglio printing method. Therefore, the adhesive 13 is continuously printed to the transfer paper 14 while passing through a printing roller 17, capable of applying any point on the wound paper 14 in the gravure printing manner.

Figure 2:
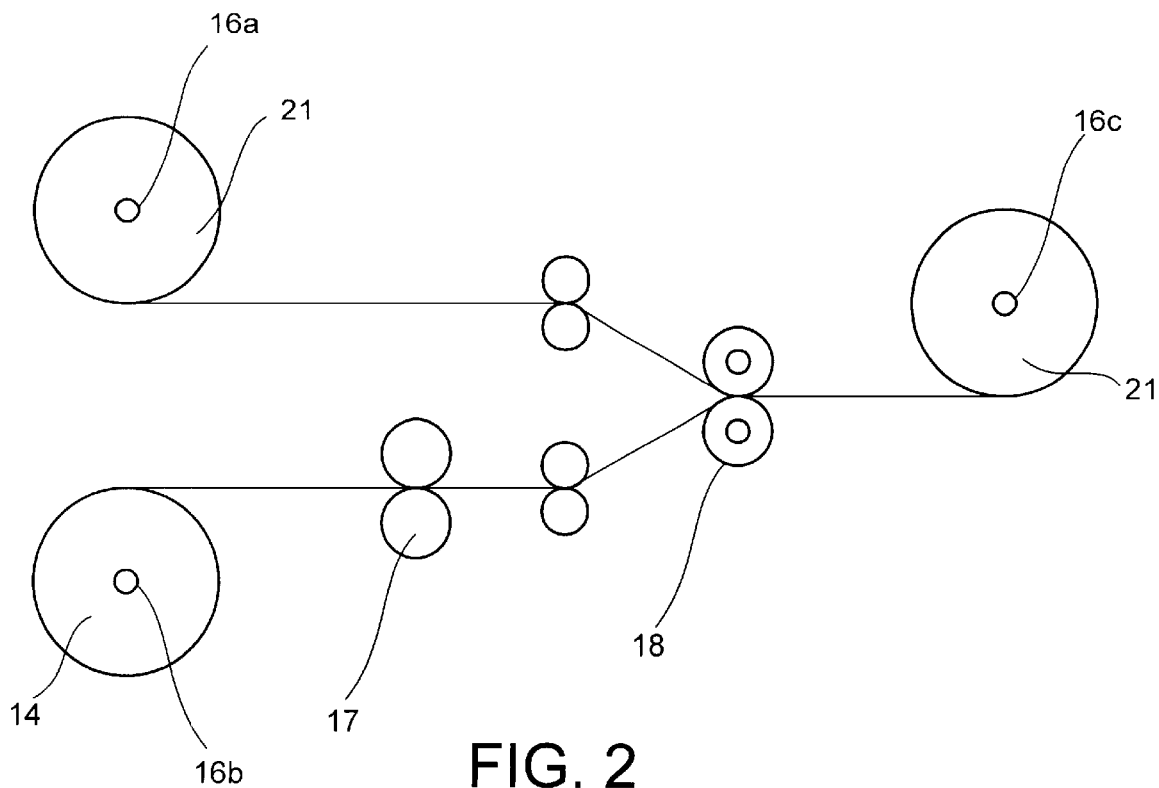
FIG. 2 is a diagram showing rollers which are operating in producing a finger tape of the present invention.

Referring to FIG. 2, the tape 21, along with the transfer paper 14 to which the adhesive 13 is printed, is passed through a pressing roller 18, whereby the adhesive 13 is transferred to the tape 21. Since the adhesive 13 transferred to the tape 21 is printed in a gravure printing manner, if not generating large amounts of sweat while using the tape 21, the sweat is discharged between the tape 21 and skin not flowing out of the tape 21. From the thumb using the tape 21 to which the hardening adhesive 13 is applied, the least amount of sweat is flown out of the tape 21 because the adhesive 13 is a hardening type, and also the adhesive 13 is flown out of the tape 21 at a minimum amount, whereby the thumb can be easily moved. On the other hand, from the middle finger and the ring finger using the tape 21 to which the softening adhesive 13 is applied, the least amount of sweat is flown out of the tape 21 because the adhesive 13 is a softening type, whereas the adhesive 13 is flown out the tape 21 at maximum amounts, whereby the middle finger and the ring finger do not glide in holes 15. Additionally, a period of time in which the middle finger and the ring finger slip out of the holes 15 is delayed so that a period of time suitable for using the middle finger and the ring finger can be obtained.

Figure 3:
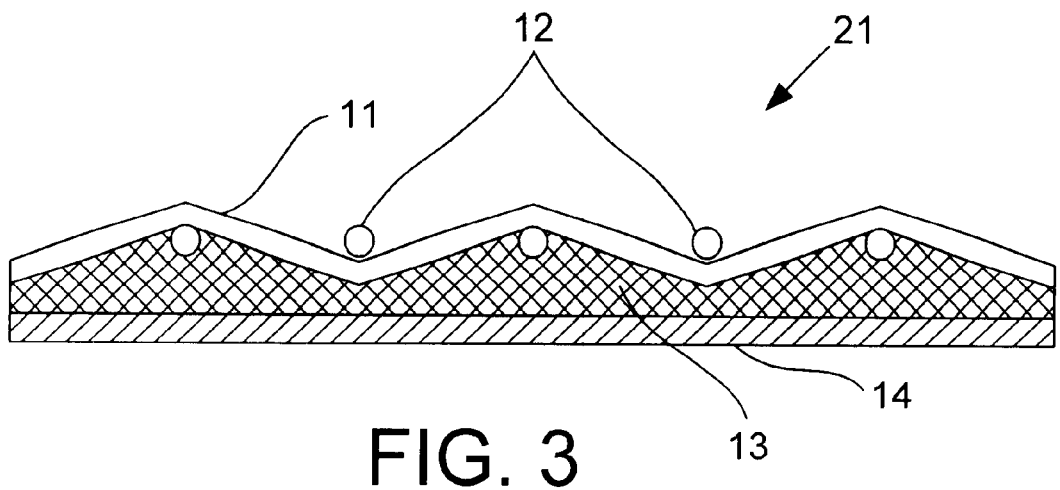
FIG. 3 is a cross sectional view of the finger tape of the present invention.

As best seen in FIG. 3, the tape 21 comprises a base cloth woven with the cotton yarn 11 and the elastic yarn 12, on one surface of which an adhesive 13 printed to the transfer paper 14 is applied.

A better understanding of the present invention may be obtained in light of the following examples which are set forth to illustrate, but are not to be construed to limit the present invention.

EXAMPLE 1

Bowling ball 19 is formed in certain spherical sizes, and comprised mostly of synthetic resins. Three holes 15 are formed in the ball so as to insert three fingers (for both males and females).

Upon bowling, a player grips the ball 19 by inserting the thumb, the middle finger and the ring finger into the holes 15 formed in the ball 19. After taking preparatory action in which the ball 19 is swung back and then forth with the arm, the player releases and rolls the ball 19 onto a floor lane. For releasing and rolling the ball 19, the thumb is first slipped out of the hole, followed by the middle finger and the ring finger spinning the ball.

The result of the bowling game can be greatly affected by the moment the fingers are slipped out from the holes 15 of the ball 19 and creating a spin. Through sweat and fatigue of the fingers, the fingers are glided in the holes or the strength of the fingers is reduced, and thus the ball is not released at the proper moment, whereby optimal results cannot be obtained. For preventing this, the thumb is allowed to be instantly slipped out from the hole 15, and the middle finger and the ring finger allow to be slipped out from the holes 15 and apply sufficient spin to the ball, with no gliding of the fingers in the holes.

The tape 21 comprising a cotton yarn (93%) and an elastic yarn (7%) has an elasticity of 20±10%. The tape of 120–130 cm in width and certain lengths is wound onto a roller 16a as illustrated in FIG. 2.

The transfer paper 14 having the same width as the tape 21 is coated with resins, and then wound onto a roller 16b as illustrated in FIG. 2.

95±0.5% by weight of the acryl resin is mixed with 5±0.5% by weight of the hardener to comprise a hardening adhesive, while 96.5±0.5% by weight of the acryl resin is mixed with 3.5±0.5% by weight of the hardener to comprise a softening adhesive.

EXAMPLE 2

With rotating the tape 21 wound onto the roller 16a and the transfer paper 14 wound onto the roller 16b at the same speeds, the transfer paper 14 is passed through a printing roller 17 and then through a pressing roller 18, together with the tape 21, followed by winding the tape on one surface of which the adhesive is applied onto a roller 16c.

The hardening adhesive 13 within 3 hours, and the softening adhesive 13 within 6 hours, are applied to the transfer paper 14 with passing the printing roller 17 as shown in the FIG. 2 in a gravure printing manner, and then transferred, wherein the gravure printing manner is a kind of intaglio printing method.

After the transfer paper 14 to which the adhesive 13 is printed, together with the tape 21, is passed through the pressing roller 18, the adhesive 13 on the transfer paper 14 is transferred to the tape 21.

The tape 21 to which the adhesive 13 is transferred is wound onto the roller 16c.

Such tape 21 is cut to certain sizes depending on practical uses, and then the paper 14 is peeled off for use. The tape 21 to which the hardening adhesive 13 is transferred is attached to the thumb, while the tape 21 to which the softening adhesive 13 is transferred is utilized to the middle finger and the ring finger.

Figure 4:
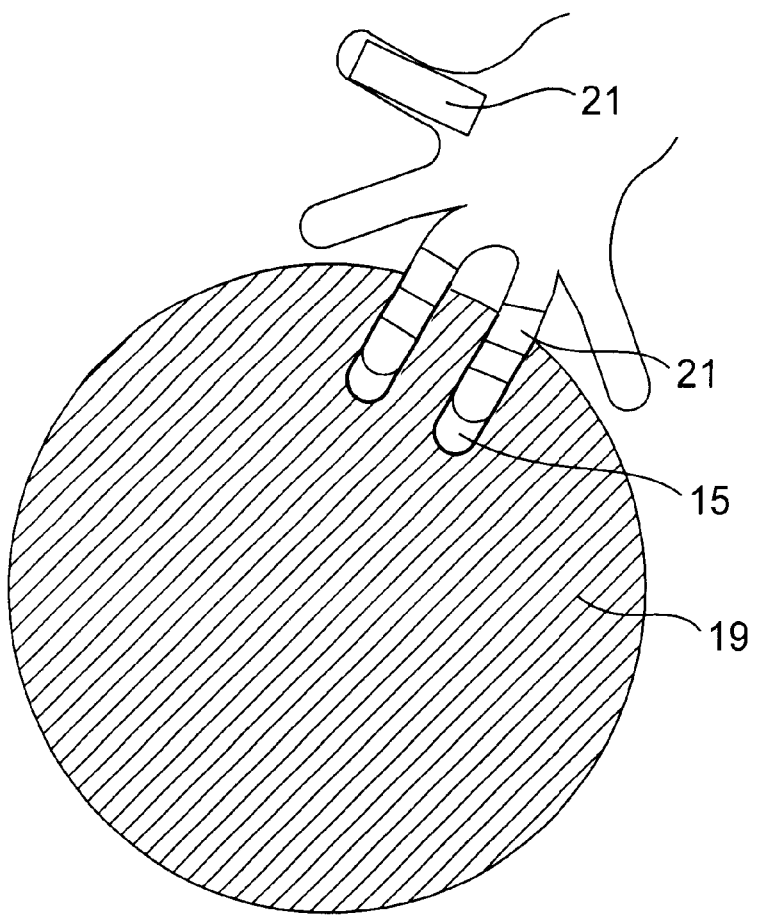
FIG. 4 is an illustration showing a ball in which fingers taped with the finger tape of the present invention are inserted.

The tape in use is illustrated in FIG. 4. As seen, the tape 21 of the present invention is applied to the thumb, the middle and the ring fingers, the latter two being inserted in the holes 15 of the ball 19.

In using the finger tape of the present invention, when the tape printed with the hardening adhesive is attached to the thumb, the sweat occurring on the fingers is flown out from the tape at minimum amounts even if playing the game for a long period of time so that the thumb can function freely and its state can be maintained as is. When the tape applied with the softening adhesive is attached to the middle finger and the ring finger, the adhesive is flown out from the tape little by little so as to prevent the middle finger and the ring finger from gliding in the holes. Additionally, the middle finger and the ring finger in the holes can grip the ball for the time after the thumb has slipped out from the hole, whereby a sufficient period of time for acting the middle finger and the ring finger can be ensured. Accordingly, the game can be continuously played with obtaining good results.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

I claim:

1. A method of providing finger tape for aiding bowling, comprising:

weaving cotton yarn and elastic yarn to form a base cloth;

gravure printing an adhesive mixture to transfer paper; and pressing said printed adhesive mixture side of said transfer paper to said base cloth, further comprising employing said finger tape for bowling in a manner selected from the group consisting of adapting said finger tape for use on a ring or middle finger with an adhesive mixture for said finger tape that is a softening adhesive produced by mixing 96.5±0.5% by weight of acryl resin with 3.5±0.5% by weight of a hardener, and adapting said finger tape for use on a thumb with an adhesive mixture for said finger tape that is a hardening adhesive produced by mixing 95±0.5% by weight of acryl resin with 5±0.5% by weight of a hardener.

2. The method of providing finger tape for aiding bowling of claim 1, wherein said base cloth has an elasticity of 20±10%.

3. The method of providing finger tape for aiding bowling of claim 2, wherein said base cloth is woven from 93% cotton yarn and 7% elastic yarn.

4. A finger tape for aiding bowling, comprising:

a base cloth of woven cotton yarn and elastic yarn;

transfer paper; and a gravure printed adhesive mixture joining said base cloth and said transfer paper, wherein said adhesive mixture is gravure printed to said transfer paper and pressed to said base cloth, wherein said gravure printed adhesive mixture for said finger tape is selected from the group consisting of:

a softening adhesive mixture consisting essentially of 96.5±0.5% by weight of acryl resin and 3.5±0.5% by weight of a hardener so as to provide a finger tape having sufficient grip between a middle or ring finger and a bowling ball for proper ball release; and a hardening adhesive mixture consisting essentially of 95±0.5% by weight of acryl resin and 5±0.5% by weight of a hardener so as to provide a finger tape having sufficient slip between a thumb and a bowling ball for proper ball release.

5. The finger tape for aiding bowling of claim 4, wherein said base cloth has an elasticity of 20±10%.

6. The finger tape for aiding bowling of claim 5, wherein said base cloth is 93% cotton yarn and 7% elastic yarn.

7. A pair of bowling finger tapes, comprising:

a middle and ring finger tape comprising:

a first base cloth of woven cotton yarn and elastic yarn, and a gravure printed softening adhesive mixture attached to said base cloth consisting essentially of 96.5±0.5% by weight of acryl resin and 3.5±0.5% by weight of a hardener, and a thumb tape comprising:

a second base cloth of woven cotton yarn and elastic yarn, and a gravure printed hardening adhesive mixture consisting essentially of 95±0.5% by weight of acryl resin and 5±0.5% by weight of a hardener.

8. The pair of bowling finger tapes of claim 7, wherein said first and second base cloth have an elasticity of 20±10%.

9. The pair of bowling finger tapes of claim 8, wherein said first and second base cloth are woven from 93% cotton yarn and 7% elastic yarn.

* * * * *